United States Patent
Fieglein et al.

(10) Patent No.: US 10,678,837 B2
(45) Date of Patent: Jun. 9, 2020

(54) MANAGEMENT OF FUEL DISPENSER MEDIA

(71) Applicant: Wayne Fueling Systems LLC, Austin, TX (US)

(72) Inventors: Henry Fieglein, Cedar Park, TX (US); Daniel Kulvicki, Leander, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 909 days.

(21) Appl. No.: 15/153,966

(22) Filed: May 13, 2016

(65) Prior Publication Data

US 2017/0329773 A1 Nov. 16, 2017

(51) Int. Cl.
| | |
|---|---|
| *G06F 16/00* | (2019.01) |
| *G06F 16/43* | (2019.01) |
| *G06F 16/9535* | (2019.01) |
| *H04L 29/08* | (2006.01) |
| *G06Q 30/02* | (2012.01) |

(52) U.S. Cl.
CPC .......... *G06F 16/43* (2019.01); *G06F 16/9535* (2019.01); *G06Q 30/0241* (2013.01); *H04L 67/10* (2013.01); *H04L 67/12* (2013.01); *H04L 67/14* (2013.01); *H04L 67/18* (2013.01)

(58) Field of Classification Search
CPC ......... G06F 17/30023; G06F 17/30867; G06F 16/53; G06F 16/63; G06F 16/43; H04L 67/18
USPC ........................................................ 707/769
See application file for complete search history.

(56) References Cited

U.S. PATENT DOCUMENTS

| | | |
|---|---|---|
| 5,890,520 A | 4/1999 | Johnson, Jr. |
| 6,032,126 A | 2/2000 | Kaehler |
| 6,098,879 A | 8/2000 | Terranova |
| 7,107,231 B1 | 9/2006 | Hall et al. |
| 2001/0034567 A1 | 10/2001 | Allen et al. |
| 2002/0042741 A1* | 4/2002 | Wilson, III ........ G06Q 30/0241 705/14.4 |

(Continued)

FOREIGN PATENT DOCUMENTS

WO     WO-2009023782 A1     2/2009

OTHER PUBLICATIONS

International Search Report and Written Opinion for Application No. PCT/US2017/032168 dated Aug. 21, 2017.

(Continued)

*Primary Examiner* — Thu Nguyet T Le
(74) *Attorney, Agent, or Firm* — Mintz Levin Cohn Ferris Glovsky and Popeo, P.C.

(57) ABSTRACT

Management of fuel dispenser media is provided. In general, a fuel dispenser can be in communication with a media library configured to facilitate delivery of media to the fuel dispenser for output therefrom. The media library can be on board the fuel dispenser or can be included in a gateway configured to communicate with the fuel dispenser. The media library is configured to query one or more media sources for media information and to retrieve media information therefrom that is specific to the fuel dispenser. Additionally or alternatively, the media library is configured to query the one or more media sources for updates to the retrieved media information and, if updated, to retrieve the updated media content from the media source(s).

20 Claims, 5 Drawing Sheets

(56) References Cited

U.S. PATENT DOCUMENTS

| 2010/0246669 A1* | 9/2010 | Harel | G06F 11/1004 |
| | | | 375/240.02 |
| 2010/0313235 A1* | 12/2010 | Straub | H04N 21/4349 |
| | | | 725/131 |
| 2010/0313236 A1 | 12/2010 | Straub | |
| 2015/0360932 A1 | 12/2015 | Bergqvist | |

OTHER PUBLICATIONS

Extended European Search Report for EP App. No. 17796844.3 dated Oct. 22, 2019.

* cited by examiner

MANAGEMENT OF FUEL DISPENSER MEDIA

FIELD

The present disclosure relates generally to management of fuel dispenser media.

BACKGROUND

The retail petroleum industry utilizes various types of fuel dispensers for dispensing fuel to customers. Some form of remote dispenser controller is traditionally used for controlling the fuel dispensers. The dispenser controller is often on the same premises as the fuel dispensers and coupled to a store interface unit so that a site attendant can monitor and control particular fueling dispensers from a building at the site (e.g., a gas station or other store). The dispenser controller sends data signals to the fuel dispensers providing various information and commands thereto. The information often includes include media for display on the fuel dispenser's display screen. Thus, traditionally, fuel dispensers must communicate with the dispenser controller in order to have media to display, thereby requiring that communication not be disabled or otherwise interrupted between the fuel dispensers and the fuel controller for media information to be communicated and eventually displayed. Additionally, the dispenser controller traditionally transmits the media information to multiple fuel dispensers, so the media received by fuel dispensers is not specific to each particular fuel dispenser receiving the media.

The dispenser controller traditionally communicates with a remote source, such as a network operating center (NOC), to receive media for transmission to the fuel dispensers. This communication model requires the fuel dispenser to communicate with the remote source with the dispenser controller as an intermediary. The fuel dispenser is thus reliant on the dispenser controller to receive updated media, which may result in delayed receipt, and therefore delayed display, of media at the fuel dispensers and/or cause inconveniences if either of the fuel dispenser or the dispenser controller loses network connectivity or becomes nonfunctional due to, e.g., power loss, component failure, incompatible software upgrade, etc. The remote source traditionally transmits updated media to the dispenser controller on a schedule determined by or otherwise programmed at the remote source, which may not be a desirable schedule for all fuel dispensers affected by the schedule and/or may delay updated media from being transmitted to the dispenser controller, and consequently to the fuel dispenser, while the updated media awaits transmission at the next scheduled transmission time.

Accordingly, there remains a need for improved management of fuel dispenser media.

SUMMARY

In general, management of fuel dispenser media is provided.

In one aspect, a fuel dispenser is provided that in one embodiment includes a media output device, a memory storing instructions, a communication unit, and a processor configured to execute the stored instructions and thereby cause a request for media to be transmitted to an external media source using the communication unit. The request for media queries whether media data stored at the external media source has been updated since a prior request for media was transmitted to the external media source using the communication unit. The processor is also configured to execute the stored instructions and thereby cause updated media received from the external media source in reply to the request for media to be stored in the memory, and the stored media to be output on the media output device to a user of the fuel dispenser.

The fuel dispenser can vary in any number of ways. For example, the request can include identification data that identifies the fuel dispenser, and the received media can be specific to the fuel dispenser's identification. The identification data can identify a geographic location of the fuel dispenser and the received media can be specific to the fuel dispenser's geographic location, and/or the identification data can uniquely identify the fuel dispenser among a plurality of fuel dispensers each configured to communicate with the external media source and the received media can be specific to the fuel dispenser's unique identification.

For another example, the request can include identification data that identifies a customer at the fuel dispenser, and the received media can be specific to the customer's identification.

For another example, the prior request for media can be a request immediately prior to the request for media being transmitted to the external media source. For yet another example, the external media source can be a network cloud. For still another example, the external media source can be located at a same fuel dispensing station as the fuel dispenser. For another example, the media output device can include at least one of a display and a speaker. For still another example, the communication unit can include at least one of a wired communication unit and a wireless communication unit.

In another aspect, a fuel dispensing system is provided that in one embodiment includes a plurality of fuel dispensers at a common geographic location, and a media library. Each of the plurality of fuel dispensers includes a media output device. The media library is configured to transmit an electronic request for media to a media source that is remote from the common geographic location, and receive media from the media source in reply to the request. The received media is targeted to the common geographic location. The media library is also configured to distribute the received media to each of the plurality of fuel dispensers for display on the media output devices of the fuel dispensers.

The system can vary in any number of ways. For example, the media library can be located at a same fuel dispensing station as at least one of the plurality of fuel dispensers. For another example, the common geographic location can include at least one of a city, a county, and a state in which each of the fuel dispensers is located. For yet another example, the media output device can include at least one of a display and a speaker.

For another example, the common geographic location can include a fuel dispensing station at which each of the fuel dispensers is located. The media library can be located at the fuel dispensing station.

In another aspect, a method of managing fuel dispenser media is provided that in one embodiment includes transmitting a request for media for a fuel dispenser from a media management module to an external media source. The request for media queries whether media data stored at the external media source has been updated since a prior request for media was transmitted to the external media source from the media management module. The method also includes receiving at the media management module updated media from the external media source in reply to the request for media, and providing the received media to the fuel dispenser for output of the media to a user of the fuel dispenser.

The media can have any number of variations. For example, the request can include identification data that identifies the fuel dispenser, and the received media can be specific to the fuel dispenser's identification. For another example, the request can include identification data that identifies a customer at the fuel dispenser, and the received media can be specific to the customer's identification. For another example, the method can include causing the received media to be output on a media output device of the fuel dispenser. For yet another example, the fuel dispenser can include a single fuel dispenser, and the media management module can be included in the fuel dispenser. For still another example, the fuel dispenser can include a plurality of fuel dispensers.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

This invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Management of fuel dispenser media is provided. In general, a fuel dispenser can be in communication with a media library configured to facilitate delivery of media to the fuel dispenser for output therefrom. The media library can be on board the fuel dispenser or can be included in a gateway configured to communicate with the fuel dispenser. The media library is configured to query one or more media sources for media information and to retrieve media information therefrom that is specific to the fuel dispenser. The media information may thus be more relevant to users of the fuel dispenser than media information that fuel dispensers traditionally receive and output. Additionally or alternatively, the media library is configured to query the one or more media sources for updates to the retrieved media information and, if updated, to retrieve the updated media content from the media source(s). The media library may thus be in control of media updates instead of the traditional model in which the media source(s) and/or a network operating center (NOC) are in control of media updates, and/or the fuel dispenser in communication with the media library may have more current media information to output and thereby improve user experience and/or increase profit opportunities.

The media information can include any one or more of various types of media. For example, the media can include advertisements for goods and/or services. The fuel dispenser(s) receiving the advertisements may thus output advertising content (e.g., notices of goods/services, coupons, "flash" deals, etc.) to users thereof, which may increase revenue for fueling site owners and/or other sellers. The goods can include any of a variety of types of goods, such as durable goods (e.g., vehicle parts, toys, etc.), perishable goods (e.g., food, drink, etc.), and intangible goods (e.g., software, digital media, etc.). The services can include any of a variety of types of services (e.g., oil changes, car washes, etc.). For another example, the media can include entertainment content, such as television content and music content. The fuel dispenser(s) receiving the entertainment content may thus output entertainment to users thereof, which may improve user experience during fueling. For yet another example, the media can include geographic content such as maps and traffic conditions. The fuel dispenser(s) receiving the geographic content may thus output information geographically relevant to users of the fuel dispenser(s). For still another example, the media can include weather content. The fuel dispenser(s) receiving the weather content may thus output information indicative of weather conditions relevant to users of the fuel dispenser(s).

The form of the media can be visual only (e.g., a still image, a silent video, etc.), audible only (e.g., music, a spoken message, etc.), or a combination of visual and audible (e.g., a video with sound, narrated still image, etc.). The media can be visually and/or audibly displayed and allow the user to access a coupon or other printable and/or electronically savable promotion for later use by the customer. For example, displayed media can include a message indicating that a coupon is available to a customer for a particular good or service that the customer may print for later use and/or access electronically for later use.

In at least some embodiments, a fuel dispenser includes a media library (e.g., has the media library on board) such that the fuel dispenser is configured to communicate directly with media source(s) and receive media content directly therefrom. The fuel dispenser can thus be configured to be in control of its own media receipt schedule, to request media content from the media source(s) on demand, and to receive media content specific to the fuel dispenser. The fuel dispenser can be originally manufactured to include the media library, or an existing fuel dispenser can be retrofit to include the media library (e.g., can have the media library installed thereon and, if necessary, have a processor added thereto or have a current processor upgraded to handle processing related to the media library).

Figure 1:
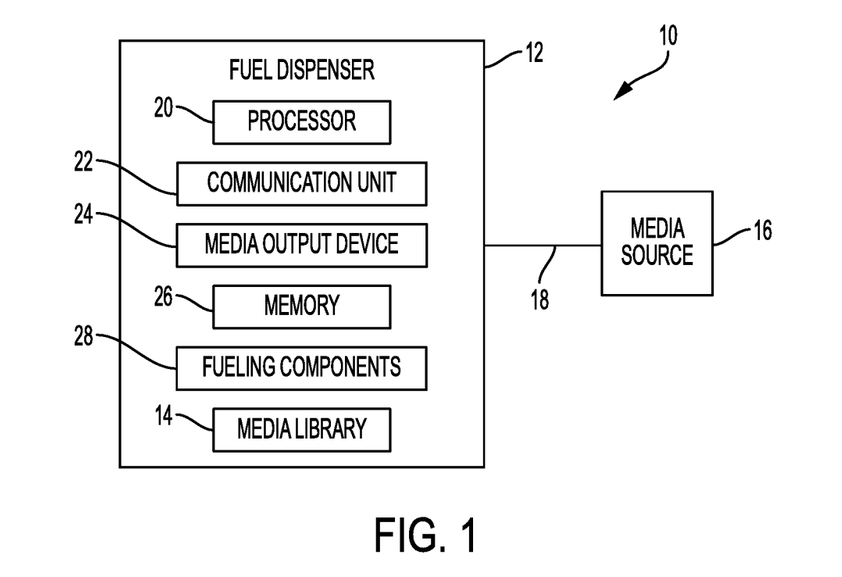
FIG. 1 is a schematic view of one embodiment of a media management system for a fuel dispenser.

FIG. 1 illustrates one embodiment of a system 10 in which a fuel dispenser 12 includes a media library 14 and is configured to communicate with a media source 16 via a communication link 18. The fuel dispenser 12 also includes a processor 20 configured to execute instructions and control various functions of the fuel dispenser 12, a communication unit 22 configured to facilitate communication over the communication link 18, a media output device 24 configured to output media to a user of the fuel dispenser 12, a memory 26 configured to store data, and fueling components 28 (e.g., a pump configured to pump fuel from a fuel reservoir through the dispenser 12, a fuel meter configured to measure an amount of fuel pumped by the pump, etc.) configured to facilitate the dispensing of fuel from the fuel dispenser 12.

The communication over the communication link 18 between the fuel dispenser 12 and the media source 16 is typically over a network (e.g. the Internet, a wireless wide area network, a local area network, a wide area network, a wired network, or the like). As will be appreciated by a person skilled in the art, the communication link 18 can include a single communication link or a plurality of interconnected communication links.

The communication unit 22 can have a variety of configurations. The communication link 18 is wireless in an exemplary embodiment, which may facilitate remote location of the media source(s) 16 from the fuel dispenser 12 and/or may facilitate setup of the communication. The communication unit 22 can accordingly be configured to facilitate wireless communication over the communication link 18 and can include, e.g., a transceiver communicating via any of a variety of wireless techniques, e.g., Bluetooth protocol, cellular protocol, WWI protocol, near field communication (NFC), a radio frequency identification (RFID) protocol, etc. Any of a variety of types of wireless connectivity hardware can be used for the wireless connectivity, as will be appreciated by a person skilled in the art. The wireless communication can be according to any of a variety of communication protocols, e.g., TCP/IP, etc., as will also be appreciated by a person skilled in the art. The wireless connectivity may facilitate wireless mesh network communication, as will be appreciated by a person skilled in the art. The types of wireless connectivity that the communication unit 22 includes can be chosen by an owner of the fuel dispenser 12 according to the owner's current fueling site setup and/or future fueling site plans, and the communication unit 22 may be manufactured and/or updated accordingly.

In another exemplary embodiment, the communication link 18 is wired, which may help prevent any communication downtime due to, e.g., network connectivity issues. The communication unit 22 can accordingly be configured to facilitate wired communication over the communication link 18 via any of a variety of wired communication protocols, e.g., TCP/IP, etc., as will be appreciated by a person skilled in the art. Some fuel dispensers are manufactured with two-wire connectivity, and the wired communication can accordingly be via two wires, such as via a controller area network bus (CANBus) two wire connection, an RS485 two wire connection, a current loop connection, or other type of two wire connection. Some fuel dispensers are additionally or alternatively manufactured with cable connectivity and can accordingly be configured to provide wired communication via cable connection, such as an Ethernet cable or other network cable. Older fuel dispensers typically have two-wire connectivity capabilities while newer fuel dispensers typically have Ethernet connectivity capabilities instead.

The media output device 24 can have a variety of configurations. For example, the media output device 24 can include a display configured to show information to a user of the fuel dispenser 12, such as a cathode ray tube (CRT) or a liquid crystal display (LCD) or a light emitting diode (LED) screen. For another example, the media output device 24 can include a speaker configured to output audio therefrom. The media output device 24 can include one or more media output devices, such as the fuel dispenser 12 including multiple displays (e.g., a display on one side of the dispenser 12 and another display on an opposite side of the dispenser 12, two displays mounted next to each other to increase an overall display size, etc.), the fuel dispenser 12 including a display and a speaker, etc.

The memory 26 can have a variety of configurations. In general, the memory 26 can be configured to temporarily and/or permanently store instructions that cause the processor 20 to perform one or more of the operations described herein, such as communication performed by the communication unit 22, updating of the media library 14, and processing payment for fuel. The memory 26 can include one or more storage units. In at least some embodiments, the media library 26 can include software stored in the memory 26.

The media source 16 includes one or more sources configured to provide media to the fuel dispenser 12 via the communication link 18. The media source 16 is typically controlled by a third party agent (e.g., a company or other merchant) that is independent of an owner of the fuel dispenser 12 (e.g., a corporate or individual owner of a fueling site that includes the fuel dispenser 12) and with which the owner of the fuel dispenser 12 contracts to access media therefrom. Examples of the media source 16 include Amazon Web Services (AWS), the Google Cloud platform, and Microsoft Azure media services, although other media sources are possible.

The media library 14 can have a variety of configurations. The media library 14 can be implemented in software, hardware, or a combination thereof. In at least some embodiments, the media library 14 can include software stored in the memory 26 and configured to be executed by the processor 20. In at least some embodiments, the media library 14 can include its own dedicated processor and memory such that the dispenser 12 includes the processor 20, which can be configured to control dispenser 12 functions other than media retrieval from the media source 16 by executing instructions stored in the memory 26, and the media library processor, which can be configured to control media retrieval from the media source 16 and to store the retrieved media in the media library memory. The dispenser 12 including a dedicated media library processor and memory may facilitate selective upgrading of the fuel dispenser 12 (e.g., upgrading the processors separately as desired) and/or retrofitting an existing fuel dispenser with the media library 14.

The communication unit 22 and the media library 14 are separate components in this illustrated embodiment, but the media library 14 can include the communication unit 22 in other embodiments (in addition to optionally including its own processor and/or memory). The communication unit 22 being a part of the media library 14 may facilitate retrofitting of the media library 14 to an existing fuel dispenser that does not have adequate communication capabilities for communicating with the media source 16.

In general, the media library 14 is configured to manage the receipt of media information from the media source 16. In an exemplary embodiment, the media library 14 is configured to query the media source 16 for media information and receive media information therefrom that is specific to the fuel dispenser 12 and to query the media source 16 for updates to the received media information and, if updated, to receive the updated media content from the media source 16. The media library 14 can thus be configured to facilitate provision of dispenser-specific media on the media output device 24 of the fuel dispenser 12 with which the media library 14 is associated, which may help ensure that users of the fuel dispenser 12 only receive media relevant to their current geographic location and/or current fueling experience. The media library 14 being configured to receive media information from the media source 16 that is specific to the fuel dispenser 16 associated with the media library 14 includes the media being specific based on at least one of a geographic location of the fuel dispenser 12 and on an owner of the fuel dispenser 12. The media being geographically specific may allow targeted media to be provided to users of the fuel dispenser 12, e.g., advertisements for goods/services available at the fueling site that includes the fuel dispenser 12, advertisements for goods/services available within a certain distance from the fueling site that includes the fuel dispenser 12, advertisements for regional goods/services, advertisements for goods/services most often purchased in the geographic area (fueling site, city, county, etc.) that includes the fuel dispenser 12, weather information for a city, county, etc. in which the fuel dispenser 12 is located, traffic information for a city, county, etc. in which the fuel dispenser 12 is located, etc. The media being owner-specific may allow the media to encourage customer purchases from the owner in addition to the fuel being dispensed by the fuel dispenser 12 and/or may facilitate appropriate media to be easily and quickly available should the fuel dispenser 12 change owners.

The media library 14 can be configured to query the media source 16 for media information and receive media information therefrom that is specific to the fuel dispenser 12 in a variety of ways. This query is an initial query to receive a full media package of information for the fuel dispenser 12. The media library 14 is configured to transmit a query to the media source 16 over the communication link 18 via the communication unit 22. The query uniquely identifies the fuel dispenser 12, such as by any one or more of including a unique code (in any form, such as numeric, alphanumeric, or alphabetical) identifying the fuel dispenser 12, a network address where the query originated, and GPS information identifying a geographic location of the fuel dispenser 12. As will be appreciated by a person skilled in the art, the query can include a single query or can include a series of related transmissions to, e.g., accommodate security requirements, meet data size restrictions of the communication link 18, etc. In response to the query, the media library 14 is configured to receive from the media source 16, via the communication link 18, media corresponding to the uniquely identified fuel dispenser 12. The media source 16 can have access to media (e.g., at memor(y/ies), server(s), etc. thereof) categorized according to the unique identification, such as in a database associating media content with unique identifications that the media source 16 may receive from the fuel dispenser 12 (and from gateways and/or other fuel dispensers), as will appreciated by a person skilled in the art. The media source 16 can thus be configured to transmit media in reply to the query that corresponds to the unique identification included in the query.

The media library 14 can be configured to query the media source 16 for updates to the received media information. The media available for output via the media output device 24 may thus be fresh, e.g., not outdated. For example, media in the form of a coupon for a good/service may expire on a certain day and can be updated with a new, non-expired coupon for the same or another good/service. For another example, media in the form of weather content can be updated to reflect a more recent weather forecast. For yet another example, media in the form of traffic content can be updated with more recent local traffic conditions. The query for and receiving of updates is generally like the query for and receiving of media information discussed above.

The media library 14 is configured to transmit the query for updated media information to the media source 16 according to a preprogrammed schedule. The schedule can be, for example, daily, weekly, or hourly. The schedule may thus be different for different dispensers, which may allow site owner customization and/or different media price tiers. Additionally or alternatively, the media library 14 configured to transmit the query for updated media information to the media source 16 in response to a trigger event. One example of a trigger event is the fuel dispenser 12 being powered on (initially or after a power interruption), which may allow the media to be fresh after the fuel dispenser 12 has been without power for a period of time and hence not receiving any media from the media source 16. Another example of a trigger event is the fuel dispenser 12 re-gaining network connectivity after a network connection loss, which may allow the media to be fresh after the fuel dispenser 12 has been unable to access the media source 16 for a period of time. Yet another example of a trigger event is the fuel dispenser 12 beginning a fueling transaction with a customer, which may allow the media to be specific to the customer. The query can include customer-identifying information, such as whether the customer belongs to a loyalty program for the fueling site, since, as will be appreciated by a person skilled in the art, the fuel dispenser 12 can be configured to recognize an identity of the customer (e.g., through payment information submitted by the customer, swipe of a loyalty card at the fuel dispenser 12, swipe of a credit card at the fuel dispenser 12, etc.). The received media may thus be retrieved in real time with a fuel transaction and may be specific to the customer, such as media related to goods/services previously purchased by the customer, which may improve customer experience and/or increase chances of customer purchases in addition to fuel.

In another exemplary embodiment, the media library 14 is not configured to receive media information from the media source 16 that is specific to the fuel dispenser 12 but is configured to query the media source 16 for media information and to query the media source 16 for updates to previously received media information and, if updated, to receive the updated media content from the media source 16. The media library 14 can thus be a more "generic" media manager that may facilitate installation of the media library 14 on the fuel dispenser 12 without special programming thereof to specify parameters specific to the fuel dispenser 12. The media library 14 may thus be less expensive and/or require less processing power.

In at least embodiments, a gateway configured to communicate with one or more fuel dispensers includes a media library such that the one or more fuel dispensers are configured to receive media content indirectly from the media source(s) via the gateway. Existing fuel dispensers may thus achieve benefits of the media library without having to have the media library installed thereon, which would be beyond the memory and/or processing capabilities of at least some existing fuel dispensers and/or be cost prohibitive for at least some fuel dispenser owners that own a very large number of fuel dispensers that would need the media library installed thereon. Using the gateway to communicate with the one or more fuel dispensers may allow a site owner (e.g., owner of the one or more fueling sites that include the one or more fuel dispensers) to use an existing gateway updated to include the media library and/or to purchase a new gateway including the media library, which may be more cost effective than purchasing new fuel dispensers that include the media library or upgrading existing fuel dispensers to include the media library. Examples of the gateway include a forecourt controller, an independent media gateway, and an intelligent firewall.

Figure 2:
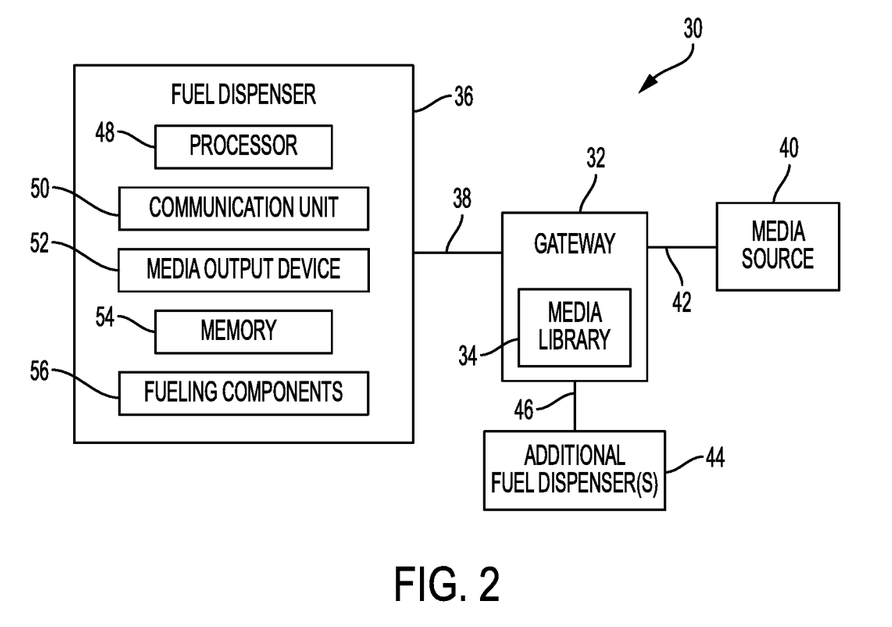
FIG. 2 is a schematic view of another embodiment of a media management system for a fuel dispenser.

FIG. 2 illustrates one embodiment of a system 30 in which a gateway 32 includes a media library 34 and is configured to communicate with a fuel dispenser 36 via a first communication link 38, with a media source 40 via a second communication link 42, and with one or more additional fuel dispensers 44 via a third communication link 46. The communication links 38, 42, 46 are shown as separate elements in FIG. 2, but as will be appreciated by a person skilled in the art, any one or more of the communication links can be combined together. Each of the communication links 38, 42, 46 can be wired or wireless.

The fuel dispenser 36 is generally configured and used similar to the fuel dispenser 12 of FIG. 1 but does not include a media library. The fuel dispenser 36 includes a processor 48 configured to execute instructions and control various functions of the fuel dispenser 36, a communication unit 50 configured to facilitate communication over the first communication link 38, a media output device 52 configured to output media to a user of the fuel dispenser 36, a memory 54 configured to store data, and fueling components 56 configured to facilitate the dispensing of fuel from the fuel dispenser 36. The one or more additional fuel dispensers 44 are each generally configured and used similar to the fuel dispenser 36. In at least some embodiments, the dispensers 36, 44 are identical to one another. The one or more additional fuel dispensers 44 can be on site with the fuel dispenser 36 (e.g., all at a same fueling station), can all be offsite from the fuel dispenser 36 (e.g., different fueling stations that are commonly owned), or some of the one or more additional fuel dispensers 44 can be on site with the fuel dispenser 36 and others of the one or more additional fuel dispensers 44 can be offsite from the fuel dispenser 36. In at least some embodiments, the gateway 32 and the dispensers 36, 44 are all commonly owned, which may facilitate maintenance thereof and/or allow consistent media management of commonly-owned dispensers.

The gateway 32 can have a variety of configurations. In general, the gateway 32 is configured as a dispenser controller and can include a computer system configured to execute various dispenser controller functions, as will be appreciated by a person skilled in the art. The media library 34 is generally configured and used similar to the media library 14 of FIG. 1 except is located at the gateway 32 and is configured to facilitate management of media for all of the dispensers 36, 44 configured to communicate with the gateway 32. The media library 34 is configured to query for and receive media information from the media source 40 that is specific to the plurality of fuel dispensers 36, 44 associated with the gateway 32, for example specific based on a common geographic location of the fuel dispensers 36, 44 and/or on a common owner of the fuel dispensers 36, 44.

The media library 34 can be configured to query the media source 40 for media information and receive media information therefrom that is specific to the fuel dispensers 36, 44 in a variety of ways. The media library 34 is configured to transmit a query to the media source 40 over the communication link 42 via a communication unit of the gateway 32 for a full media package of information for the fuel dispensers 36, 44. The query uniquely identifies the fuel dispensers 36, 44 for which the media is being requested, such as by a unique code identifying the fuel dispenser 36, 44 as a group, a network address where the query originated, and GPS information identifying a geographic location of the gateway 32. In response to the query, the media library 34 is configured to receive from the media source 40, via the communication link 42 media corresponding to the uniquely identification provided thereto. The media library 34 is configured to then transmit the received media to the fuel dispensers 36, 44 for storage and output thereat. If any one or more of the fuel dispensers 36, 44 are offline when the media is retrieved by the media library 34 such that the media library 34 cannot transmit the media thereto for storage and output thereat, the media library 34 can be configured to transmit the media thereto when the offline fuel dispenser(s) 36, 44 come back online. The offline fuel dispenser(s) 36, 44 may thus still receive media even if offline at the time of media information retrieval. The media library 34 can be configured to periodically retry the transmission of the media to the offline dispenser(s) 36, 44 until transmission is successful, or the media library 34 can be configured to transmit the media to the offline dispenser(s) 36, 44 in response to receipt of a message therefrom indicating a return to the online state.

Similar to that discussed above, the media library 34 can be configured to query the media source 40 for updates to the received media information and can be configured to transmit the query for updated media information to the media source 40 according to a preprogrammed schedule. If any one or more of the fuel dispensers 36, 44 are offline when updated media is retrieved by the media library 34 such that the media library 34 cannot transmit the updated media thereto for storage and output thereat, the media library 34 can be configured to transmit the updated media thereto when the offline fuel dispenser(s) 36, 44 come back online. The offline fuel dispenser(s) 36, 44 may thus receive updated media even offline at the time of updated media information retrieval.

The media library 34 can be configured to query the media source 40 for full media and updated data for all of the dispensers 36, 44 as discussed above, or the media library 34 can be configured query the media source 40 for full media and updated data for selected subsets of the dispensers 36, 44. Querying for selected subsets may allow the media library 34 to provide more targeted media to the dispensers 36, 44 based on the subsets to which they belong. For example, a first subset of the dispensers 36, 44 can be located at a first fueling site and a second subset of the dispensers 36, 44 can be located a second fueling site.

Figure 3:
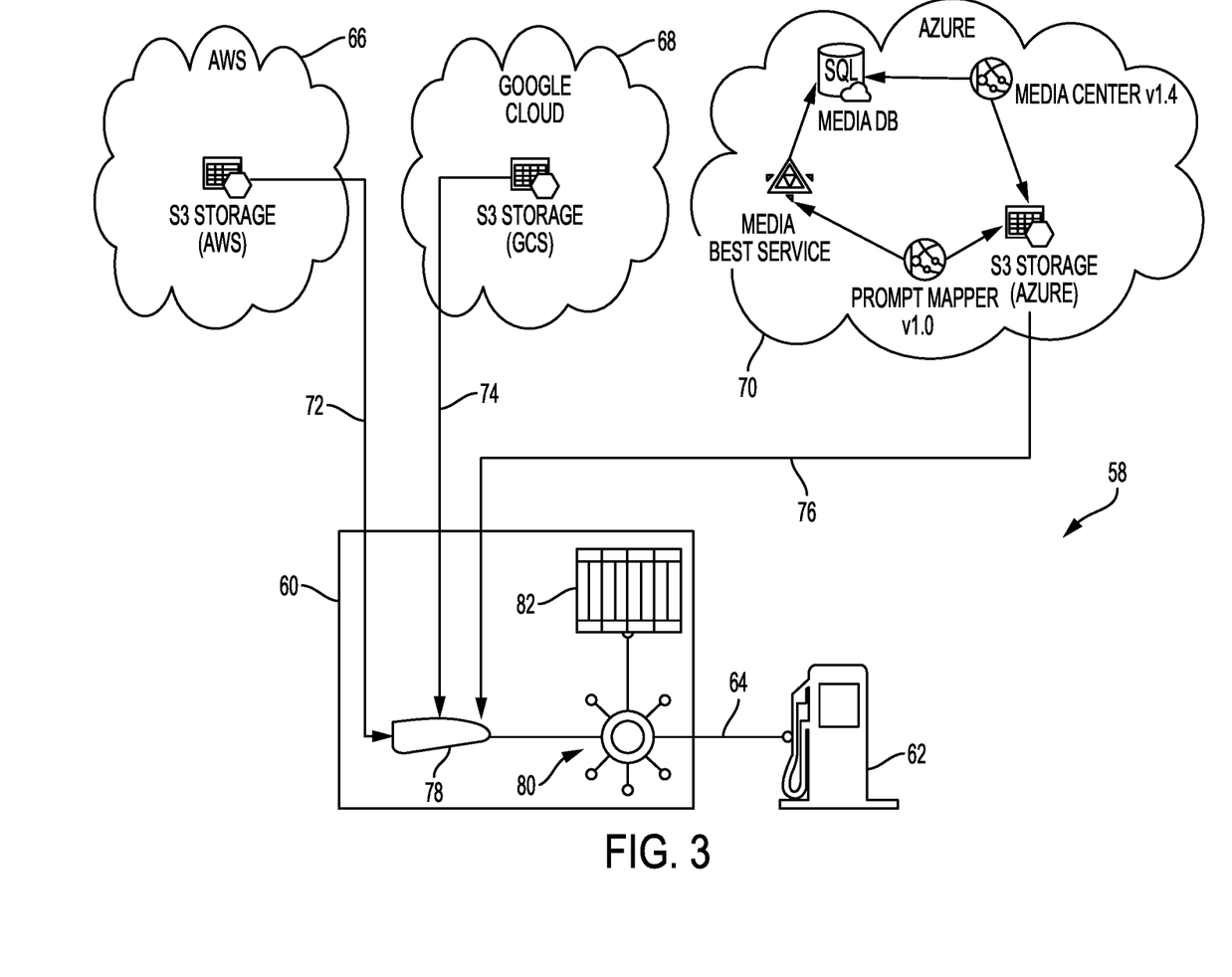
FIG. 3 is a schematic view of yet another embodiment of a media management system for a fuel dispenser.

FIG. 3 illustrates another embodiment of a system 58 in which a gateway 60 includes a media library 78 and is configured to communicate with a fuel dispenser 62 via a first communication link 64 and with each of a plurality of media sources 66, 68, 70 via respective communication links 72, 74, 76. Only one fuel dispenser 62 is shown in the system 58 as being in communication with the gateway 60, but as mentioned above, the gateway 60 can be, and typically is, in communication with a plurality of fuel dispensers. The communication links 72, 74, 76 are shown as separate elements in FIG. 3, but as will be appreciated by a person skilled in the art, any one or more of the communication links can be combined together. Each of the communication links 72, 74, 76 can be wired or wireless. The media sources include AWS 66, the Google Cloud platform 68, and Microsoft Azure media services 70 configured per their typical setups but, as mentioned above, other media sources can additionally or alternatively be provided. The gateway 60 also includes a network hub 80 configured to facilitate communication between the gateway 60 and one or more additional fuel dispensers and a firewall 82 configured to facilitate network security. In other embodiments, the network hub 80 and/or the firewall 82 can be separate components from the gateway 60, which may facilitate modularity.

Figure 4:
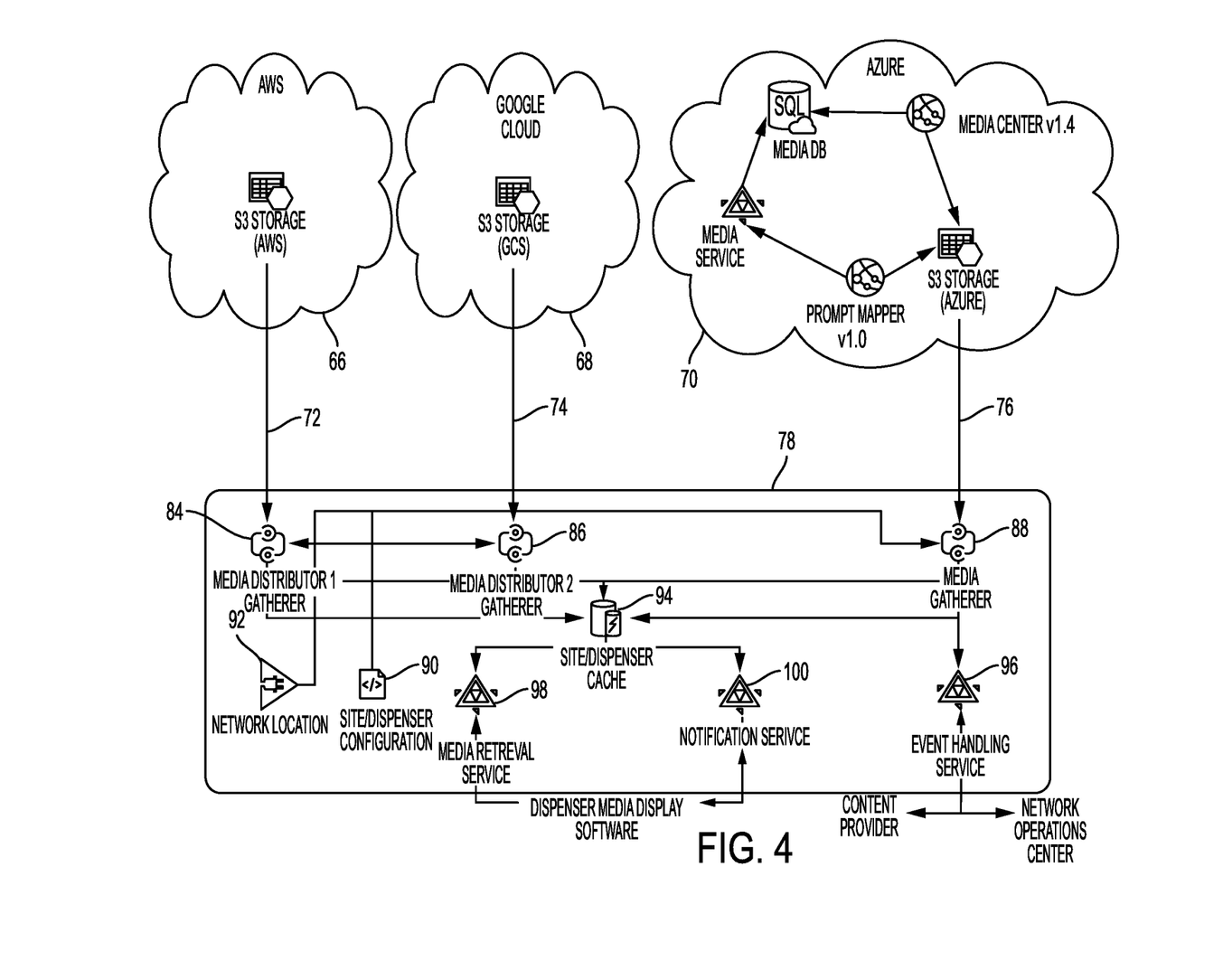
FIG. 4 is a schematic view of a portion of the system of FIG. 3.

FIG. 4 illustrates the media library 78 in further detail and shows its communication configuration with respect to the media sources 66, 68, 70. The media library 78 includes a first media distributor and gatherer 84 configured to communicate with the AWS 66, a second media distributor and gatherer 86 configured to communicate with the Google Cloud 68 and the first media distributor and gatherer 84, and a third media distributor and gatherer 88 configured to communicate with the Azure media services 70 and the first media distributor and gatherer 84. The media distributer and gatherers 84, 86, 88 are each configured to query and retrieve media from their associated ones of the media sources 66, 68, 70. Having dedicated media distributer and gatherers 84, 86, 88 for each of the media sources 66, 68, 70 may facilitate communication with the media sources 66, 68, 70 according to their various security and other communication requirements, may allow for retrieval of media from different media sources according to different preprogrammed schedules, and/or may allow for simultaneous media updates from different media sources. The media library 78 also includes stored site/dispenser configuration information 90 (e.g., unique information to identify the dispenser 62, a site of the dispenser 62, etc.) and stored network location information 92 (e.g., unique location information of the gateway 78, etc.) each in communication with the third media distributor and gatherer 88. The media library 78 also includes a site/dispenser cache 94 of received media information in communication with the first media distributor and gatherer 84, the third media distributor and gatherer 88, and an event handling representational state transfer (REST) service module (e.g., an application program interface (API)) 96 configured to communicate with one or more external modules such as a content provider and a NOC. The media library 78 also includes a media retrieval REST service module (e.g., an API) 98 and a notification service REST module (e.g., an API) 100, which is configured to communicate with external media output software (e.g., media display software, etc.) that manages dispenser media output so that media received from the media sources 66, 68, 70 is output via the media output device of the dispenser 62 (and any other fuel dispensers associated with the gateway 60, as discussed above). The site/dispenser cache 84 is configured to communicate with each of the media retrieval service module 98 and the notification service module 100.

Figure 5:
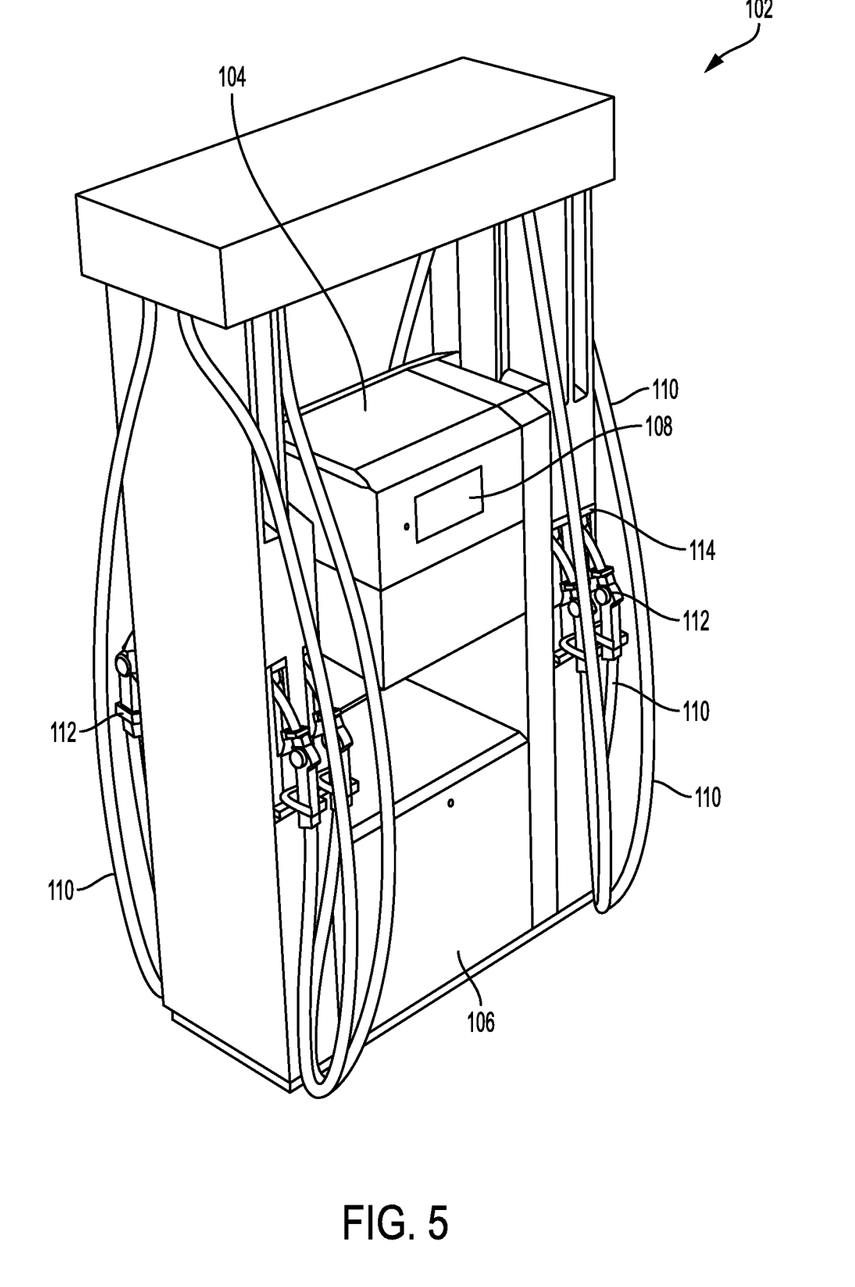
FIG. 5 is a perspective view of one embodiment of a fuel dispenser.

FIG. 5 illustrates one embodiment of a fuel dispenser 102 that includes a media library as discussed herein. The fuel dispenser 102 includes an electronics compartment 104 and a pump compartment 106. The electronics compartment 104 has therein electronics for facilitating payment for fuel and for facilitating the dispensing of the fuel. The electronics include, for example, the media library, a controller, a communication unit configured to electronically communicate wired and/or wirelessly, a display 108 configured to show information (e.g., media content, payment information, etc.) thereon, a memory configured to store data therein, and a payment terminal (e.g., a card reader, etc.) configured to facilitate customer payment. The electronics are obscured in FIG. 5 except for the display 108. A second display is on the other side of the electronics compartment 104 but is obscured in FIG. 5. The fuel dispenser 102 can be configured for mobile payment instead of or in addition to payment through the payment terminal and hence need not include the payment terminal.

The pump compartment 106 has therein a pump configured to pump fuel from a fuel tank or other reservoir and has therein a fuel meter configured to monitor fuel flow. The pump compartment 106 can include other elements to facilitate fuel dispensing, such as valves, a vapor recovery system, etc. The pump compartment 106 is isolated from the electronics compartment 104 within the fuel dispenser 102 to facilitate safety, security, and/or maintenance, as will be appreciated by a person skilled in the art. Fuel is thus not allowed to flow from the pump compartment 106 to the electronics compartment 104 and instead flows from the pump compartment 106 through hoses 110 to nozzles 112 for dispensing. As will be appreciated by a person skilled in the art, the nozzles 112 are each configured to dispense fuel from the fuel dispenser 102 as pumped therefrom by the pump.

The fuel dispenser 102 is configured to be connected to the fuel tank or other reservoir containing fuel. When filling up the tank of a motor vehicle, the fuel is pumped from the tank or reservoir by the pump located in the pump compartment 106 and to a nozzle 112 via a fuel pipe (not shown) and a fuel hose 110. When each fuel hose 110 is not in use, the fuel hose 110 hangs along the fuel dispenser 102, and its associated nozzle 112 is seated in a nozzle boot 114. The fuel dispenser 102 includes four hoses 110 and four nozzles 112 on one side of the dispenser 102 and four hoses 110 and four nozzles 112 on the other side of the dispenser 102, but as will be appreciated by a person skilled in the art, the fuel dispenser 102 can include another number of hoses 110 and nozzles 112. A person skilled in the art will also appreciate that the fuel dispenser 102 can have various other configurations.

A fuel dispenser similar to the dispenser 102 of FIG. 5 can be configured to communicate with a gateway that includes a media library as discussed herein. In other words, a fuel dispenser can be configured similar to the dispenser 102 of FIG. 5 except not have a media library onboard and be configured to communicate with the gateway to receive media content for output from the dispenser.

Figure 6:
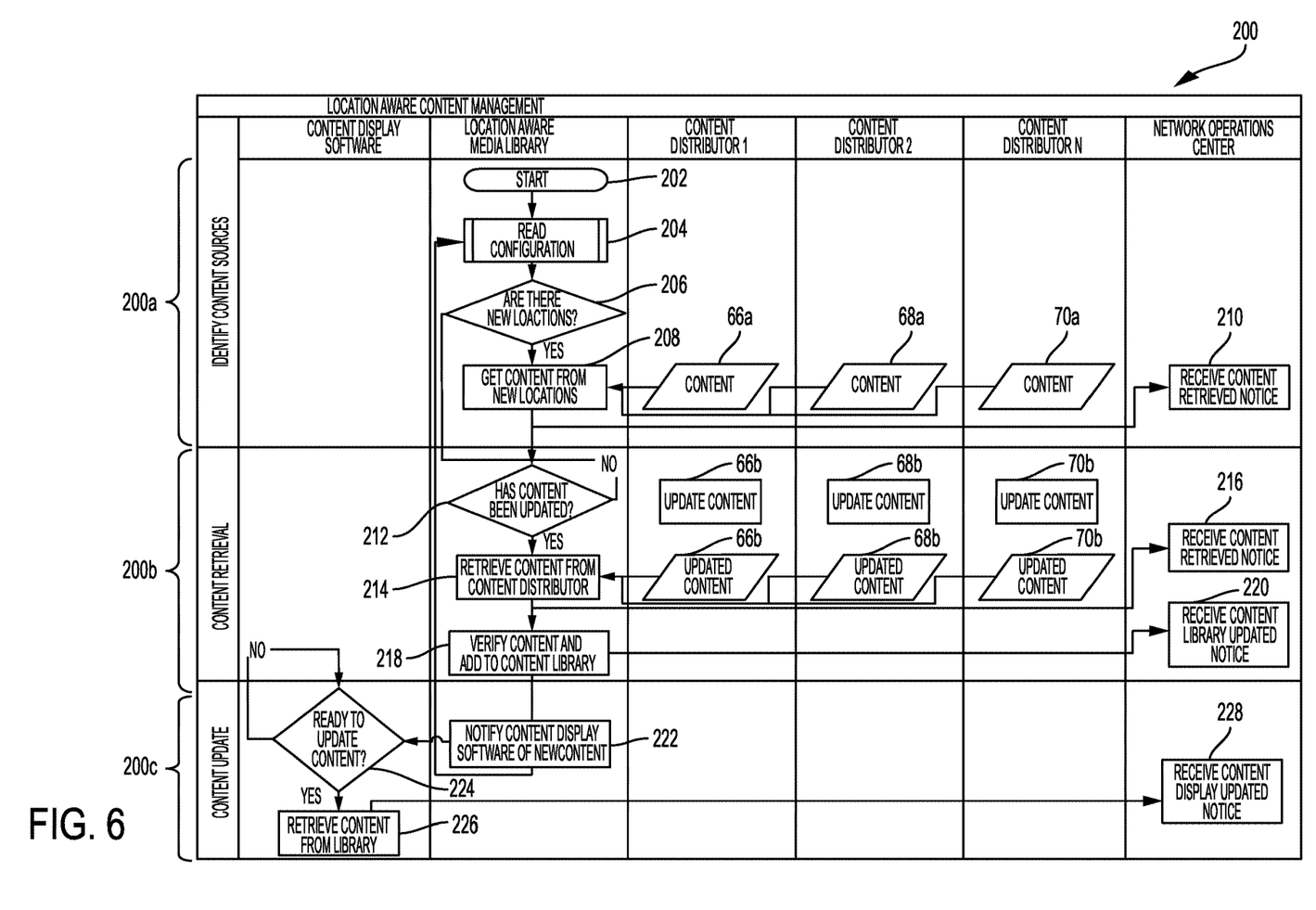
FIG. 6 is a flowchart showing one embodiment of a method of managing media for a fuel dispenser.

FIG. 6 illustrates one embodiment of a method 200 of media management for a fuel dispenser. The method 200 is described with respect to the system 58 and fuel dispenser 62 of FIG. 3, but the method 200 can be similarly implemented in other systems and with other fuel dispensers described herein.

The method 200 generally includes three phases. A first phase 200*a* of the method 200 generally involves the media library 78 identifying sources of media content. A second phase 200*b* of the method 200 generally involves the media library 78 retrieving media content from the media sources identified in the first phase 200*a*. A third phase 200*c* of the method 200 generally involves the media library 78 updating the fuel dispenser 62 with media content.

The method 200 starts 202 with the media library 78 executing 204 a subroutine to read configuration thereof with respect to media sources with which the media library 78 is in communication. The execution 204 of the subroutine can be carried out in any number of ways, as will be appreciated by a person skilled in the art, such as a processor thereof executing instructions in a memory thereof. Based on the configuration check, the media library 78 determines 206 if there are any new media sources 66, 68, 70 with which the media library 78 is in communication, e.g., any media sources with which the media library 78 was not in communication with at a last configuration check. For example, the media library 78 can determine whether a new media content and distributer has been installed thereon, thereby indicating that a new media source has become accessible to the media library 78. For another example, the media library 78 can check a lookup table stored in a memory to determine whether a new media source has been added to the table, such as through manual user update thereof. For yet another example, the site/dispenser configuration information 90 can be checked to determine if a new media source has been added thereto for the fuel dispenser 62 (or a group of fuel dispensers including the fuel dispenser 62, as discussed above).

If there are any new media sources 66, 68, 70 with which the media library 78 is in communication, the media library 78 retrieves 208 media content from each of the new media sources. In this illustrated embodiment, each of the three media sources 66, 68, 70 are shown as transmitting media content 66*a*, 68*a*, 70*a* to the media library 78, which indicates an initial setup scenario. The media library 78 can retrieve 208 the media content in any number of ways. For example, each of the media library's media distributor and gatherers 84, 86, 88 determined to be new can transmit a query to its associated one of the media sources 66, 68, 70 over its associated one of the communication links 72, 74, 76. The query can identify the fuel dispenser 62 (or the group of fuel dispensers including the fuel dispenser 62) and can request the media source to transmit to the media library 78 any media content for the identified fuel dispenser 62 (or the identified group of fuel dispensers). The media source may then use the identification to determine which of its stored media content is associated with the identified fuel dispenser 62 (or the identified group of fuel dispensers) and transmit that media content to the media library 78. At least some of the media content can be default media content associated with all fuel dispensers, not just the identified fuel dispenser 62 (or the identified group of fuel dispensers), which may allow the fuel dispenser 62 (or the fuel dispensers in the group of fuel dispensers) to have at least some media content to output should its specific media content become too outdated for output (e.g., weather information being more than one day old, traffic information being more than one hour old, coupons being expired, etc.). After receiving 208 the new media content, the media library 78 (e.g., the event handling service module 96 thereof) transmits 210 to a NOC with which the gateway 60 is in communication a notification that the new media has been retrieved by the media library 78. The notification to the NOC that the media library 78 has received new media content from new media sources may allow the NOC to analyze efficiency of media management and/or verify that media content from new media sources has been transmitted to the media library 78 as expected. The media library 78 also stores the retrieved new media content thereat, e.g., in a content library (e.g., the cache 94) in a memory of the media library 78.

After the media library 78 has received 208 the media content from the new media sources, the media library 78 determines 212 whether the media content previously retrieved by the media library 78 has been updated at the media sources 66, 68, 70 with which the media library 78 is in communication. In other words, the media library 78 determines 212 whether any of the media sources 66, 68, 70 with which the media library 78 is in communication has any updated media content 66*b*, 68*b*, 70*b* that has not yet been transmitted to the media library 78. All of the media sources 66, 68, 70 are shown as having updated media content 66*b*, 68*b*, 70*b*, but less than all (e.g., zero, one, or two) of the media sources 66, 68, 70 may have updated media content 66*b*, 68*b*, 70*b* at this determination 212. The media library 78 can make this determination 212 in any of a variety of ways. For example, each of the media library's media distributor and gatherers 84, 86, 88 can transmit a query to its associated one of the media sources 66, 68, 70 over its associated one of the communication links 72, 74, 76 querying whether the media source has updated the content 66*a*, 68*a*, 70*a* previously transmitted to the media library 78 for the identified fuel dispenser 62 (or the identified group of fuel dispensers). Media content transmissions from the media sources 66, 68, 70 to the media library 78 and previous media content requests from the media library 78 to the media sources 66, 68, 70 can be date/time stamped to facilitate this determination 212.

If the media library 78 determines 206 that there are not any new media sources 66, 68, 70 with which the media library 78 is in communication, the media library 78 determines 212 whether media content previously retrieved by the media library 78 has been updated at the media sources 66, 68, 70 with which the media library 78 is in communication.

If the media library 78 determines 212 that the media content previously retrieved by the media library 78 has not been updated, the media library 78 maintains its currently stored media content and waits until a next preprogrammed time and/or until occurrence of a predetermined trigger event to determine 212 whether the previously retrieved media content has been updated.

If the media library 78 determines 212 that the media content previously retrieved by the media library 78 has been updated, the media library 78 retrieves 214 the updated media content 66*b*, 68*b*, 70*b* from the one or more of the media sources 66, 68, 70 that have the updated media content 66*b*, 68*b*, 70*b*. The media library 78 can retrieve 214 the updated media content in any number of ways. For example, each of the media library's media distributor and gatherers 84, 86, 88 associated with a media source determined to have updated media content can transmit a query to its associated one of the media sources 66, 68, 70 over its associated one of the communication links 72, 74, 76. The query can identify the fuel dispenser 62 (or the group of fuel dispensers including the fuel dispenser 62) and can request the media source to transmit to the media library 78 the updated media content. The media source may then transmit the updated media content to the media library 78. In at least some embodiments, the determining 212 and the retrieving 214 can be combined such that instead of a first query being transmitted to determine the existence of updated media content and a second query being sent in the event that updated media content exists, a single query is sent inquiring whether updated media content exists and requesting that any such updated media be transmitted to the media library 78.

After receiving 214 the updated media content, the media library 78 (e.g., the event handling service module 96 thereof) transmits 216 to the NOC a notification that the updated media has been retrieved by the media library 78. The notification to the NOC that the media library 78 has received updated media content from media sources may allow the NOC to analyze efficiency of media management and/or verify that media content from media sources has been transmitted to the media library 78 as expected.

The media library 78 verifies 218 the received new or updated media content. The media library 78 can verify 218 the received new or updated media content in any of a variety of ways. For example, the updated media content can be encoded with codes for each piece of media content therein (e.g., each advertisement, each coupon, etc.) that the media library 78 can compare with codes encoded with the previously stored media content, verifying the updated media content if the codes match. For another example, the verification 218 of new or updated media content can include security key authentication.

The media library 78 stores 218 the verified new or updated media content thereat, e.g., in the media library's content library.

After verifying and storing 218 the new or updated media content, the media library 78 (e.g., the event handling service module 96 thereof) transmits 220 to the NOC a notification that the new or updated media has been stored at the media library 78. The notification to the NOC that the media library 78 has stored new or updated media content from media sources may allow the NOC to analyze efficiency of media management and/or verify that media content from media sources has been added at the media library 78 as expected.

After verifying and storing 218 the new or updated media content, the media library 78 notifies 222 the fuel dispenser 62 (or the group of fuel dispensers) that new or updated media content is available for the fuel dispenser 62 (or the group of fuel dispensers). The notification 222 can be provided in any number of ways. For example, the notification service REST module 100 can transmit a message to the fuel dispenser 62, e.g., to dispenser media output software stored in a memory of the fuel dispenser 62, indicating that new or updated media content is available for the fuel dispenser 62.

In reply to the notification 222, the media library 78 receives a reply from the fuel dispenser 62 when the fuel dispenser 62 is ready 224 to receive the new or updated media content, e.g., when network connectivity in online between the fuel dispenser 62 (or group of fuel dispensers), when the fuel dispenser 62 has available processing resources, when the fuel dispenser 62 has authenticated the gateway 60, etc. In response to the reply, the media library 78 (e.g., the media retrieval REST service module 98) retrieves 226 the new or updated the new or updated media content stored at the media library 78 (e.g., at the cache 94) and transmits the retrieved 226 new or updated media content to the fuel dispenser 62, e.g., via the notification service REST module 100.

After retrieving 226 the new or updated media content, the media library 78 (e.g., the event handling service module 96 thereof) transmits 228 to the NOC a notification that the new or updated media has been retrieved for the fuel dispenser 62. The notification to the NOC that the media library 78 has stored new or updated media content from media sources may allow the NOC to analyze efficiency of media management and/or verify that new or updated media content from media sources has been processed for the fuel dispenser 62. In at least some embodiments, the notification to the NOC can be transmitted 228 after the transmission of the new or updated media content to the fuel dispenser 62.

The method 200 may allow media content to be delivered to one or more fuel processors without requiring manual processes present in traditional delivery of media content to fuel dispensers, such as manually preparing new or updated media content at a NOC for fuel dispensers at a fueling site, and without requiring manual intervention in the event of media content delivery failure, such as manually transmitting new or updated media content to a previously offline fuel dispenser. Media content may thus be kept more up to date at fuel dispensers and/or may be delivered to fuel dispensers in a more timely fashion, with less effect on fuel dispensers since media content may be transmitted more frequently thereto and thus not require large amounts of media content to be packaged together and sent at a same time but instead be spread out over time as the media content becomes available from media sources, and/or with less chance of human error.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The media management described above is discussed with respect to media management for fuel dispensers, but media can be similarly managed for other types of devices configured to output media to customers or potential customers. For example, a media management system for one or more taxis that include a media output device (e.g., a display screen in a back seat of the taxi, etc.) can include a media library configured to provide the one or more taxis with new and updated media content based on a unique identification of the taxi or a group of taxis (e.g., a group of commonly-owned taxis, a group of taxis in a same geographic area such as in a same city or in a same zip code, etc.). Riders of the taxi may thus receive more timely and/or more relevant media content during their rides. For another example, a media management system for one or more elevators that include a media output device (e.g., a display screen on a wall of the elevator, etc.) can include a media library configured to provide the one or more elevators with new and updated media content based on a unique identification of the elevator or a group of elevators (e.g., a group of commonly-owned elevators, a group of elevators in a same geographic area such as in a same building, a same city, or in a same zip code, etc.). Riders of the elevator may thus receive more timely and/or more relevant media content during their rides.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A fuel dispenser, comprising:
   a media output device of the fuel dispenser;
   a memory of the fuel dispenser, the memory storing instructions;
   a communication unit of the fuel dispenser; and
   a processor of the fuel dispenser configured to execute the stored instructions and thereby cause
      a first request for media to be transmitted to an external media source using the communication unit,
      media received from the external media source in reply to the first request for media to be stored in the memory,
      the stored media to be output on the media output device to a user of the fuel dispenser,
      a second request for media to be transmitted to the external media source using the communication unit, the second request for media querying whether media data stored at the external media source has been updated since the first request for media was transmitted to the external media source using the communication unit,
      updated media received from the external media source in reply to the second request for media to be stored in the memory, and
      the stored updated media to be output on the media output device to a user of the fuel dispenser.

2. The fuel dispenser of claim 1, wherein each of the first request and the second request includes identification data that identifies the fuel dispenser, and the received media and the received updated media is specific to the fuel dispenser's identification.

3. The fuel dispenser of claim 2, wherein the identification data identifies a geographic location of the fuel dispenser, and the received media and the received updated media is specific to the fuel dispenser's geographic location.

4. The fuel dispenser of claim 2, wherein the identification data uniquely identifies the fuel dispenser among a plurality of fuel dispensers each configured to communicate with the external media source, and the received media is specific to the fuel dispenser's unique identification.

5. The fuel dispenser of claim 1, wherein the second request includes identification data that identifies a customer at the fuel dispenser, and the received updated media is specific to the customer's identification.

6. The fuel dispenser of claim 1, wherein the first request for media is a request immediately prior to the second request for media being transmitted to the external media source.

7. The fuel dispenser of claim 1, wherein the external media source is a network cloud.

8. The fuel dispenser of claim 1, wherein the external media source is located at a same fuel dispensing station as the fuel dispenser.

9. The fuel dispenser of claim 1, wherein the media output device includes at least one of a display and a speaker.

10. The fuel dispenser of claim 1, wherein the communication unit includes at least one of a wired communication unit and a wireless communication unit.

11. A fuel dispensing system, comprising:
    a plurality of fuel dispensers at a common geographic location, each of the plurality of fuel dispensers including a media output device; and
    a media library configured to transmit an electronic request for media to a media source that is remote from the common geographic location, receive media from the media source in reply to the request, and distribute the received media to each of the plurality of fuel dispensers for display on the media output devices of the fuel dispensers, the received media being targeted to the common geographic location, wherein the media library is located at a same fuel dispensing station as at least one of the plurality of fuel dispensers.

12. The system of claim 11, wherein the common geographic location includes the fuel dispensing station.

13. The system of claim 11, wherein the common geographic location includes at least one of a city, a county, and a state in which each of the fuel dispensers is located.

14. The system of claim 11, wherein the media output device includes at least one of a display and a speaker.

15. A method of managing fuel dispenser media, comprising:
   transmitting a first request for media for a fuel dispenser from a media management module of the fuel dispenser to an external media source;
   receiving at the media management module updated media from the external media source in reply to the first request for media;
   causing the media to be output to a user of the fuel dispenser;
   transmitting a second request for media for the fuel dispenser from the media management module to the external media source, the second request for media querying whether media data stored at the external media source has been updated since a the first request for media was transmitted to the external media source from the media management module;
   receiving at the media management module updated media from the external media source in reply to the second request for media; and
   causing the updated media to be output to a user of the fuel dispenser.

16. The method of claim 15, wherein each of the first request and the second request includes identification data that identifies the fuel dispenser, and the received media and the received updated media is specific to the fuel dispenser's identification.

17. The method of claim 15, wherein the second request includes identification data that identifies a customer at the fuel dispenser, and the received updated media is specific to the customer's identification.

18. The method of claim 15, wherein the received media is output on a media output device of the fuel dispenser; and the received updated media is output on the media output device of the fuel dispenser.

19. The method of claim 15, wherein the fuel dispenser includes a single fuel dispenser.

20. The method of claim 15, wherein the fuel dispenser includes a plurality of fuel dispensers.

* * * * *